United States Patent
de Oliveira

(10) Patent No.: US 7,707,296 B2
(45) Date of Patent: Apr. 27, 2010

(54) METHOD AND APPARATUS FOR SELECTING A MEDIA PROCESSOR TO HOST A CONFERENCE

(75) Inventor: Marcelo Gomes de Oliveira, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 1244 days.

(21) Appl. No.: 10/611,292

(22) Filed: Jun. 30, 2003

(65) Prior Publication Data

US 2005/0021619 A1    Jan. 27, 2005

(51) Int. Cl.
G06F 15/16    (2006.01)
(52) U.S. Cl. .............. 709/229; 709/224; 709/226; 709/227; 718/105; 370/260
(58) Field of Classification Search ......... 709/204, 709/219, 227, 203, 205, 226, 224, 229; 718/104, 718/105; 370/260–261; 348/14.09
See application file for complete search history.

(56) References Cited

U.S. PATENT DOCUMENTS

| | | | |
|---|---|---|---|
| 4,460,807 A | 7/1984 | Kerr et al. | |
| 4,577,065 A | 3/1986 | Frey et al. | |
| 4,635,251 A | 1/1987 | Stanley et al. | |
| 4,691,347 A | 9/1987 | Stanley et al. | |
| 5,012,509 A | 4/1991 | Nakamura et al. | |
| 5,680,392 A | 10/1997 | Semaan | |
| 5,737,010 A | 4/1998 | Yachi et al. | |
| 5,758,076 A * | 5/1998 | Wu et al. ............... | 709/231 |
| 5,889,989 A * | 3/1999 | Robertazzi et al. ...... | 718/105 |
| 5,898,870 A * | 4/1999 | Okuda et al. ........... | 718/105 |
| 5,963,547 A | 10/1999 | O'Neil et al. | |
| 6,167,432 A | 12/2000 | Jiang | |
| 6,378,130 B1 * | 4/2002 | Adams .................. | 709/219 |
| 6,404,745 B1 | 6/2002 | O'Neil et al. | |
| 6,526,445 B1 | 2/2003 | Kumar et al. | |
| 6,542,462 B1 * | 4/2003 | Sohraby et al. ......... | 370/229 |
| 6,606,643 B1 * | 8/2003 | Emens et al. .......... | 709/203 |
| 6,744,741 B1 * | 6/2004 | Ju et al. .............. | 370/260 |
| 6,976,055 B1 * | 12/2005 | Shaffer et al. ......... | 709/204 |
| 7,003,086 B1 * | 2/2006 | Shaffer et al. ......... | 379/202.01 |
| 7,113,992 B1 * | 9/2006 | Even .................. | 709/227 |
| 7,133,806 B2 * | 11/2006 | Prasad ................ | 702/186 |
| 7,281,051 B2 * | 10/2007 | Whynot et al. ......... | 709/229 |
| 7,552,225 B2 * | 6/2009 | Creamer et al. ........ | 709/227 |
| 2004/0186904 A1 * | 9/2004 | Oliveira ............... | 718/105 |
| 2005/0021619 A1 * | 1/2005 | Gomes de Oliveira ..... | 709/204 |

* cited by examiner

*Primary Examiner*—Ramy M Osman
(74) *Attorney, Agent, or Firm*—Buckley, Maschoff & Talwalkar LLC

(57) ABSTRACT

A system, method, apparatus, means, and computer program code for selecting a media processor to host a conference is provided. According to some embodiments, a multipoint controller may control or be associated with a plurality of media processors. Different media processors may be implemented in software and operating on different hardware platforms. When a request for a media processor is indicated or received and the multipoint controller needs to select or allocate a media processors to host the conference, the multipoint controller may select one of the media processors to support the new conference based on the media processor's ability to support more additional participants than the other media processors in the plurality of media processors. In some embodiments, the determination of a media processor's ability to support additional participants may be based on the media processor's current number of supported participants in conferences and the media processor's current CPU utilization percentage.

16 Claims, 4 Drawing Sheets

| | | | |
|---|---|---|---|
| | | 300 | |
| MP Number 302 | CurrentNbChannels 304 | CurrentCPUUtil 306 | NbChannels 308 |
| 1 | 23 | 7 | 256 |
| 2 | 6 | 23 | 16 |
| 3 | 99 | 57 | 49 |
| 4 | 98 | 83 | 2 |
| 5 | 36 | 87 | -1 |
| 6 | 44 | 92 | -3 |
| 7 | 34 | 17 | 136 |
| 8 | 54 | 79 | 4 |
| 9 | 63 | 74 | 9 |
| 10 | 18 | 49 | 13 |
| 11 | 3 | 82 | 0 |
| 12 | 71 | 47 | 57 |
| 13 | 48 | 34 | 72 |
| 14 | 82 | 23 | 221 |
| 15 | 90 | 11 | 605 |
| 16 | 26 | 23 | 70 |
| 17 | 27 | 10 | 203 |
| 18 | 80 | 63 | 28 |
| 19 | 80 | 68 | 20 |
| 20 | 58 | 90 | -3 |
| 21 | 52 | 82 | 2 |
| 22 | 26 | 100 | -4 |

FIG. 3

METHOD AND APPARATUS FOR SELECTING A MEDIA PROCESSOR TO HOST A CONFERENCE

FIELD

The invention relates to a method and apparatus for selecting a media processor to host a conference.

BACKGROUND

In some conferencing systems, a single multipoint controller (MC) may control or be associated with multiple media processors (MP), also referred to as multipoint processors. The multipoint controller may need to select which media processor to use for a new conference when a new conference session is requested.

In some systems, the multipoint controller (MC) may check to see how many conferencing participants are allocated to each media processor (MP) controlled by the multipoint controller. Based on this information, the multipoint controller can select the media processor with the fewest participants to host the new conference. Unfortunately, such an approach does not take into account the fact that a software based or implemented media processor may operate on a wide variety of hardware platforms. For example, suppose one media processor currently is running or supporting ten channels/participants for a conference on a Pentium III™ based computer operating at 866 MHz and a second media processor is running or supporting fifteen channels/participants for a conference on a Pentium IV™ based server operating at 2 GHz. The traditional approach would choose the Pentium III™ based computer for supporting a new conference, even though the Pentium IV™ based server may be able to support a much larger number of new conferencing channels/participants. By using the Pentium III™ based computer, the multipoint controller increases the likelihood of not being able to expand the conference to support all of the required participants for the new conference, particularly since the number of participants for a conference may be unknown at the time of creation of the conference and may change over time.

It would be advantageous to provide a method and apparatus that overcame the drawbacks of the prior art. In particular, it would be desirable to provide a method, apparatus, means, and computer code that considers the fact that different software based media processors may have different capabilities and processing resources depending on the hardware on which they are operating.

SUMMARY

Embodiments provide a system, method, apparatus, means, and computer program code for selecting a software based or implemented media processor to host a conference based on hardware capabilities and processing resources on the hardware on which the media processors are operating. In some embodiments, a multipoint controller may control or be associated with a plurality of media processors. The multipoint controller may be able to allocate a media processor to host or otherwise support a new conference. One or more of media processor's may be implemented in software operating on different hardware platforms.

When a new conference needs to be created, the multipoint controller needs to select or allocate one of the plurality of media processors to host the conference. The multipoint controller may select one of the media processors to support the new conference based on the media processor's ability to support more additional participants than the other media processors in the plurality of media processors. In some embodiments, the determination of a media processor's ability to support additional participants may be based on the media processor's current number of supported participants in conferences and the media processor's current CPU utilization percentage.

Additional advantages and novel features of the invention shall be set forth in part in the description that follows, and in part will become apparent to those skilled in the art upon examination of the following or may be learned by the practice of the invention.

According to some embodiments, a method for selecting a media processor to host a new conference may include receiving an indication of a need for a media processor for a new conference; determining, for each of a plurality of media processors under the control of a multipoint controller, a current number of conference participants and a current CPU utilization; and determining one of the plurality of media processors to host new conference based, at least in part, on the current number of conference participants and current CPU utilization for each of the plurality of media processors. In some embodiments, systems, means, and/or computer code may implement the one or more of the methods described herein. For example, some embodiments may include a multipoint controller, wherein the multipoint controller controls a plurality of media processors and the multipoint controller is adapted to select a first media processor from the plurality of media processors to support a new conference based on the first media processor's ability to support more additional participants than other media processors in the plurality of media processors.

With these and other advantages and features of the invention that will become hereinafter apparent, the nature of the invention may be more clearly understood by reference to the following detailed description, the appended claims and to the several drawings attached herein.

BRIEF DESCRIPTION OF THE DRAWINGS

The accompanying drawings, which are incorporated in and form a part of the specification, illustrate some embodiments of the present invention, and together with the descriptions serve to explain the principles therein.

FIG. 3 is a table providing a representative example of use of the method of FIG. 2.

DETAILED DESCRIPTION

Applicant has recognized that there is a market opportunity for systems, means, computer code, and methods that facilitate selection of a media processor (MP) to host a conference, particularly when one or more MPs for a multipoint control unit (MCU) or implemented in software on one or more devices and the devices have different capabilities.

Figure 1:
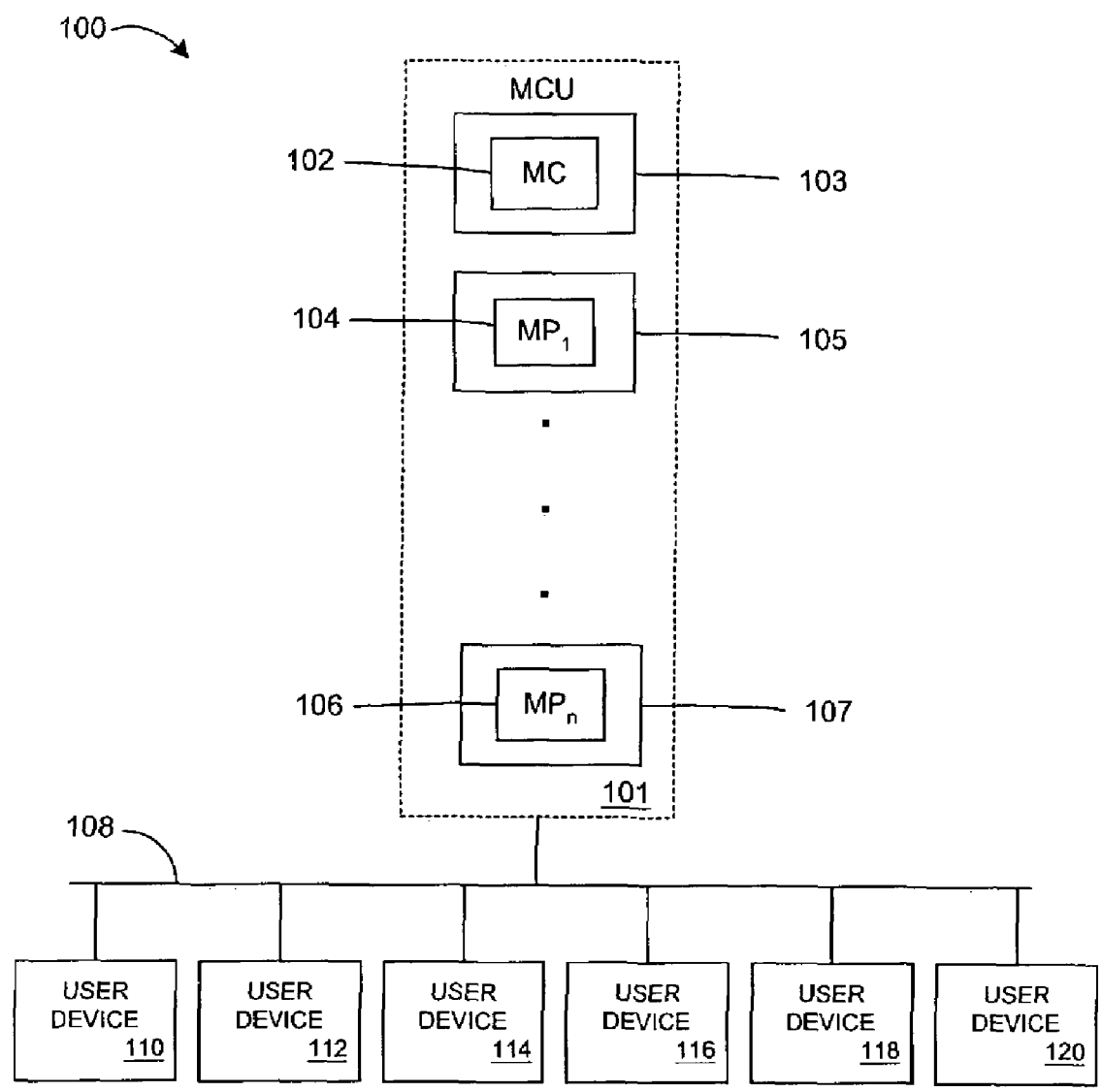
FIG. 1 is an illustration of some embodiments of a system wherein a media processor can be selected to host a conference.

Now referring to FIG. 1, a system 100 usable for a multipoint conference or a conference with multiple participants may include an MCU 101 may include different components, some or all of which may be operating on different devices. Thus, the MCU 101 may be operating or implemented in a decomposed manner or configuration. For example, the MCU 101 may include an MC (multipoint controller) 102 operating on a device 103, a first MP (media processor or multipoint processor) 104 operating on a device 105, and an nth MP 106 operating on a device 107. Thus, the MCU 101 may include two or more MPs, some or all of which are software based or implemented and some or all of which are operating on different devices. Each of the MPs may be able to support multiple participants in multiple conferences. The MC 102 may control or be associated with each of the MPs 104, 106. Each of the devices 103, 105, 107 may have different capabilities or hardware/software platforms such as, for example, different CPU (central processing unit) or operating speeds, different processors, different memory capacities, different data transfer rates, different operating systems, etc.

The components of the MCU 101 may be connected to or in communication with a network 108 that allows the MCU 101 to host conferences involving two or more of the user devices 110, 112, 114, 116, 118, 120 (also referred to as endpoints or terminals). Participants in a conference may use the user devices 110, 112, 114, 116, 118, 120 to join a conference and communicate with each other during the conference.

In some embodiments, the network 108 may include a local area network (LAN) implemented using a TCP/IP network and may implement voice or multimedia over IP using, for example, the Session Initiation Protocol (SIP) or the H.323 protocol. In some embodiments, the network 108 might be or include the Internet, the World Wide Web, or some other public or private computer, cable, telephone, client/server, peer-to-peer, or communications network or intranet. In some embodiments, a communications network also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology.

In some embodiments, other devices, networks, or applications may be connected to or in communication with the network 108 directly or indirectly, such as a gateway, a gatekeeper, a private branch exchange (PBX), a public switched telephone network (PSTN), a wireless or cellular network, etc.

In some embodiments, one or more of the user devices 110, 112, 114, 116, 118, 120 may be personal computers. In addition, one or more of the user devices 110, 112, 114, 116, 118, 120 may include telephony and other multimedia messaging capability using, for example, peripheral cameras, Web cams, microphones and speakers (not shown) or peripheral telephony handsets, such as the Optipoint™ handset, available from Siemens Corporation. In other embodiments, one or more of the user devices 110, 112, 114, 116, 118, 120 may be implemented as wireless telephones, digital telephones, or personal digital assistants (PDAs).

As will be discussed in more detail below, when the MCU 101 receives a request for a new conference, the MC 102 needs to allocate or select an MP to use for the new conference or otherwise host the new conference. During the conference, the MCU 101 may combine audio, video, control, and/or data streams originating from different user devices to other user devices taking part in the conference. The MC 102 may provide control of the user devices in the conference while MPs may provide mixing, switching and other processing for the conference. The MC 102 may handle negotiations between the user devices to determine common capabilities for audio and/or video processing and may control resources such as multicasting. In general, the MC 102 may not deal directly with any of the audio, video, and/or data streams, as this is left to the MPs. The MPs may do the audio mixing, data distribution, and video switching or mixing and may provide conversion between different CODECs and bit rates. In some embodiments, the MC 102 and one or more of the MPs 104, 106 may be implemented on or by the same device.

Process Description

Figure 2:
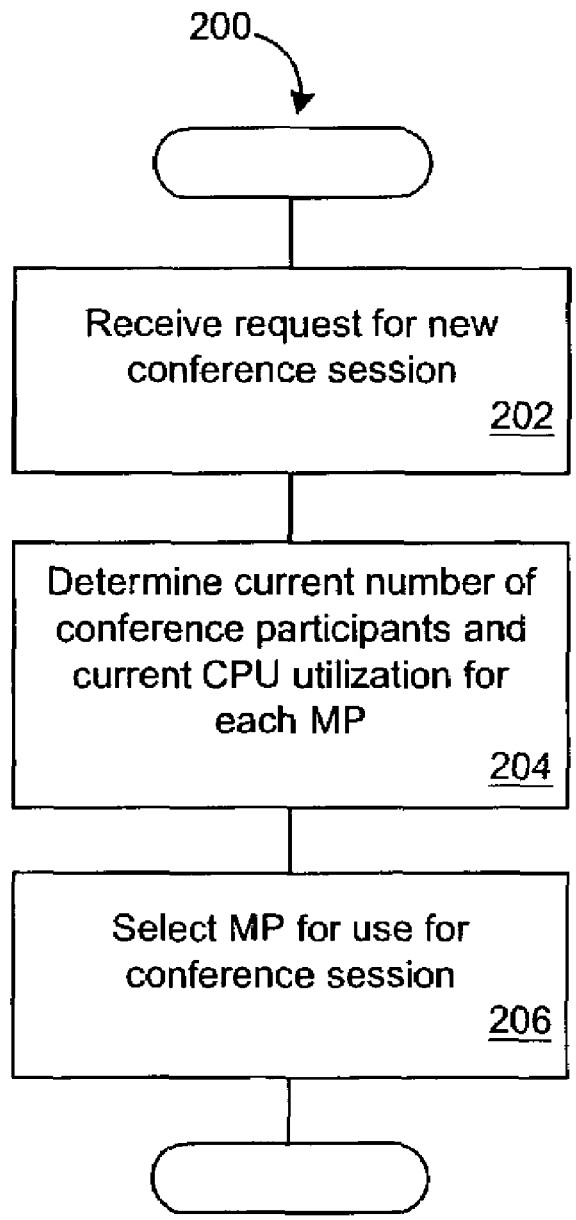
FIG. 2 is a flowchart of a first embodiment of a method.

Reference is now made to FIG. 2, where a flow chart 200 is shown which represents the operation of a first embodiment of a method. The particular arrangement of elements in the flow chart 200 is not meant to imply a fixed order to the elements; embodiments can be practiced in any order that is practicable. In some embodiments, some or all of the elements of the method 200 may be performed or completed by the MC 102, as will be discussed in more detail below.

Processing begins at 202 during which the MC 102 receives or otherwise obtains a request for a new conference session, which may include or be the MC 102 receiving an indication that it needs to select or allocate an MP for a conference or that a media processor is needed for a new conference session. In some embodiments, 202 may be or include the MC 102 receiving a request for allocation of an MP for a conference.

During 204, the MC 102 calculates or otherwise determines the current number of conference participants on each MP under its control and the current CPU utilization of each of the MPs under its control. For example, the MP 104 currently may be supporting forty participants in various conferences while the MP 106 currently may be supporting fifteen participants in various conferences. The MP 104 currently may be operating at a CPU utilization percentage of forty percent (40%) while the MP 106 currently may be operating at a CPU utilization percentage of thirty percent (30%). In some embodiments, different CPU utilizations for different MPs may be created as a result of different types of processors on the devices supporting the different MPs, different operational speeds for the processors on the devices supporting the different MPs, the use and requirements of other software or applications operating on the devices supporting the different MPs, etc.

For purposes of elaboration, but not limitation, the following definitions are used:

"CurrentNbChannels" for an MP is the current number of conference participants on the MP.

"CurrentCPUUtil" for an MP is the current CPU utilization percentage of the MP.

The CurrentNbChannels and the CurrentCPUUtil values for an MP may change over time as conferences start and end, participants join and leave conferences, devices implementing MPs vary resource allocations or change operational characteristics, etc. In some embodiments, the method 200 may include the MC 102 calculating CurrentNbChannels and the CurrentCPUUtil values for one or more MPs on a regular or periodic basis, random basis, as-needed basis, or when a request for an MP for a new conference is received or otherwise obtained. In some embodiments, the MC 102 may store, update, or maintain information regarding one or more MPs in a database, log, or other electronic resource. This information could even be piggybacked on regular exchanged messages on the control channel between the MC 102 and the MPs.

During 206, the MC 102 selects or otherwise determines one of the MPs for use for the conference session or to host the conference based on the information determined and used during 204. More specifically, in some embodiments, the MC 102 can select the MP for the new conference that can support the highest number of new conference participants. By making the selection this way, the MC 102 can reduce the probability of failure during resource allocation that may be caused by insufficient resources on the selected MP or the device on which the MP is operating. Thus, during 206 the MC 102 selects or determines an MP based on a quantification of how many additional channels or participants the MP can support based on its current load or the load, configuration, capabilities, etc. of the device implementing the MP. In addition, selection of an MP in this manner addresses the possibility of a software based MP being able to run on a wide range of hardware platforms with different processing power and amount of available resources. Since the number of participants for a new conference may be unknown at the time the new conference is requested, or when an MP or allocated to the new conference, and may change over time as the conference is on-going, selection using 204 and 206 reduces the possibility of not being able to expand the current conference to support all of the required participants.

In some embodiments, the MC 102 can determine the number of new conference participants or channels each MP under its control can support by the following:

$$NbChannels = CurrentNbChannels \times ((MaxCPUUtil/CurrentCPUUtil) - 1)$$

Where "MaxCPUUtil" for an MP is a constant that indicates the maximum CPU utilization percentage allowed for the MP. The MaxCPUUtil constant usually is required by the system to avoid overload conditions. The MaxCPUUtil constant may be the same for each MP controlled by the MC 102. In some embodiments, the method 200 may include determining, establishing or setting the MaxCPUUtil value, which may be or include the MC 102 being programmed or provided with the MaxCPUUtil value or the MC 102 receiving, retrieving, accessing or otherwise obtaining data indicative of the MaxCPUUtil value. The value "NbChannels" for an MP is the estimated number of participants that can still be added to or supported by the MP before it reaches the MaxCPUUtil value.

If the CurrentNbChannels value for an MP currently is zero, then it should be set to one for purposes of the calculation. In addition, if the CurrentCPUUtil value for an MP currently is zero, then it should be set to one for purposes of the calculation. Making these adjustments for purposes of the calculations ensures that the result is still accurate for the case where the MP is not processing or supporting any participants or conferences and so that division by zero in the calculation of a CurrentNbChannels value for an MP is avoided.

As one example of the method 200, now referring to table 300 in FIG. 3, if the MaxCPUUtil value is assumed to be eighty-five percent (85%) for the twenty-two MPs referenced in column 302 and the CurrentNbChannels and CurrentCPUUtil values for the twenty-two MPs are as indicated in columns 304 and 306 of table 300, then the calculated NbChannels values for the twenty-two MPs are as provided in column 308 of table 300. Note that in some cases the calculated NbChannels value for an MP may be negative. As indicated in the table 300, MP number "15" can be selected as the best MP to start or support a new conference as it can support the highest number of additional conference participants as indicated by its NbChannels value (i.e., 605) in column 308.

In some embodiments, the method 200 may include the MC 102 providing data indicative of the selected MP to a device, application, etc. and/or the MC 102 providing data indicative of one or more of the values calculated or determined in 204 and/or 206 to a device, application, etc. In some embodiments, the method 200 may include the MC 102 allocating the MP determined or selected during 206 to host the conference.

In a more elaborated embodiment of the invention, the method 200 may also include the MC 102 storing historical performance data for each of the MPs and using the stored data to extract statistical performance information that could be used on step 206 to provide a more accurate estimation of the number of available channels for each of the MPs.

As another example of how a method may be implement, in some embodiments, a method for selecting a media processor to host a new conference may include receiving an indication of a need for a media processor for a new conference; determining, for each of a plurality of media processors under the control of a multipoint controller, a number of additional participants that can be supported; and determining one of the plurality of media processors to host new conference based, at least in part, on the number of additional participants that each of the plurality of media processors can support. In some embodiments, determining, for each of a plurality of media processors under the control of a multipoint controller, a number of additional participants that can be supported, may include determining a CurrentNbChannels value and a CurrentCPUUtil value for each of the plurality of media processors. Similarly, in some embodiments, determining, for each of a plurality of media processors under the control of a multipoint controller, a number of additional participants that can be supported, may include determining an NbChannels value for each of the plurality of media processors.

As described above, in some embodiments a system may include a multipoint controller, wherein the multipoint controller controls a plurality of media processors and the multipoint controller is adapted to select a first media processor from the plurality of media processors to support a new conference based on the first media processor's ability to support more additional participants than other media processors in the plurality of media processors. The multipoint controller also may be adapted to determine a current number of conference participants and a current CPU utilization for at least some of the plurality of media processors, determine the first media processor's ability to support additional participants based, at least in part, on the first media processor's current number of conference participants and current CPU utilization, and/or determine a NbChannels value for the media processor.

Device

Figure 4:
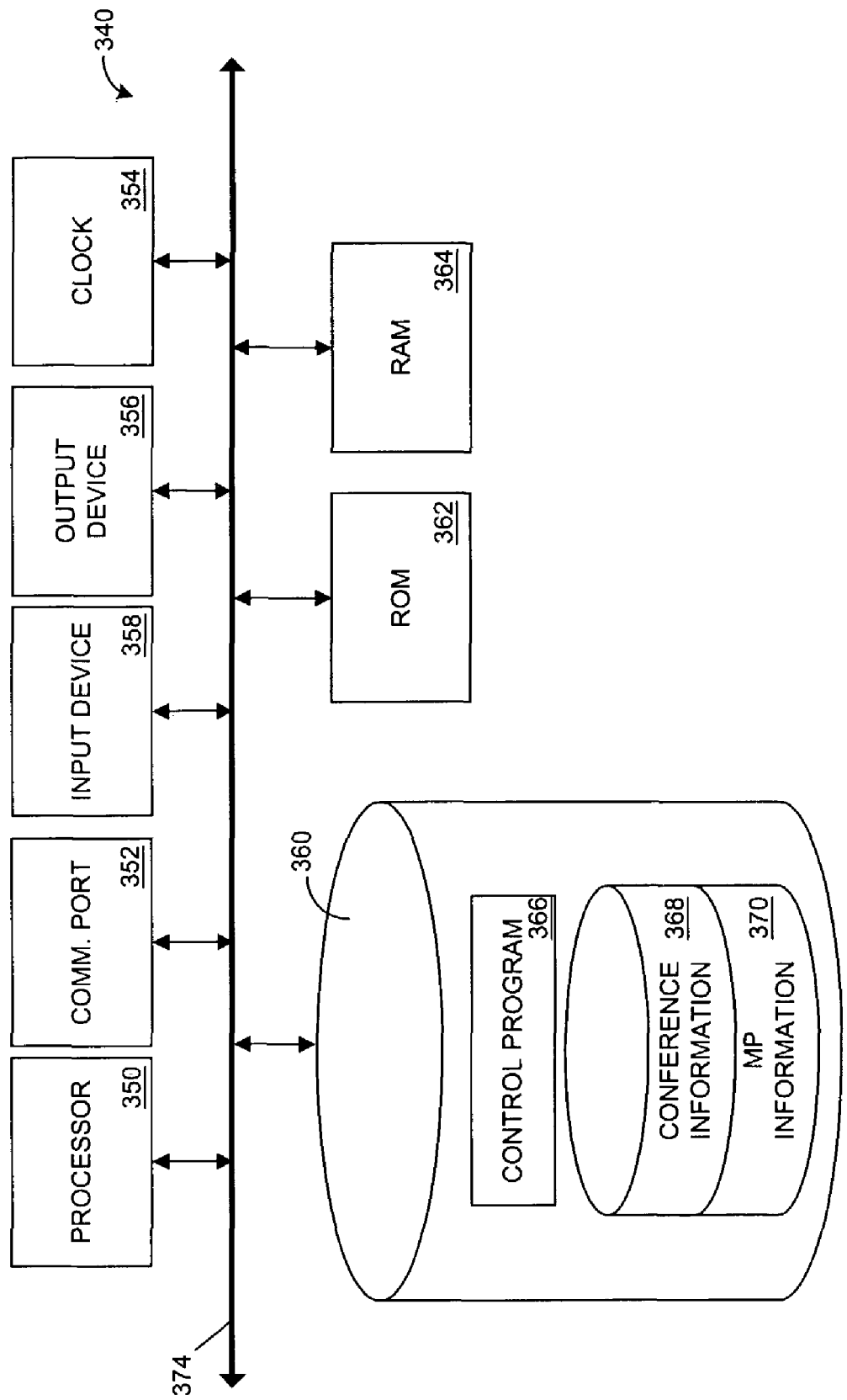
FIG. 4 is a block diagram of components for an embodiment of a system usable in some embodiments.

Now referring to FIG. 4, a representative block diagram of a device 340 is illustrated. In some embodiments, the device 340 may implement or be adapted or operative to implement one or more elements or methods described herein. In some embodiments, the device 340 may support or implement the MC 102 and/or one or more MPs. The device 340 may implement an MC and/or one or more MPs as software and include one or more MP software components or applications in addition to the components illustrated in FIG. 4.

The device 340 may include a processor, microchip, central processing unit, or computer 350 that is in communication with or otherwise uses or includes one or more communication ports 352 for communicating with user devices and/or other devices. In some embodiments, the processor 350 may be operative to implement one or more of the elements or methods described herein. Communication ports may include such things as local area network adapters, wireless communication devices, Bluetooth technology, etc. The device 340 also may include an internal clock element 354 to maintain an accurate time and date for the device 340, create time stamps for communications received or sent by the device 340, etc.

In some embodiments, the device 340 may include one or more output devices 356 such as a printer, infrared or other transmitter, antenna, audio speaker, display screen or monitor (e.g., the monitor 102), text to speech converter, etc., as well as one or more input devices 358 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the device 340 may include a memory or data storage device 360 to store information, software, databases, communications, device drivers, permissions, files, etc. The memory or data storage device 360 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The device 340 also may include separate ROM 362 and/or RAM 364.

The processor 350 and the data storage device 360 in the device 340 each may be, for example: (i) located entirely within a single computer or other computing device; or (ii) connected to each other by a remote communication medium, such as a serial port cable, telephone line or radio frequency transceiver. In one embodiment, the device 340 may comprise one or more computers that are connected to a remote server computer for maintaining databases.

In some embodiments, a conventional personal computer, host computer, personal data assistant, kiosk, terminal, server, cellular telephone, endpoint, workstation, etc. with sufficient memory and processing capability may be used as or as part of the device 340. A Pentium™ microprocessor, such as the Pentium III™ or IV™ microprocessor manufactured by Intel Corporation, may be used for the processor 350. Equivalent or alternative processors are available from Motorola, Inc., AMD, or Sun Microsystems, Inc. The processor 350 also may comprise one or more microprocessors, computers, computer systems, etc.

Software may be resident and operating or operational on the device 340. The software may be stored on the data storage device 360 and may include a control program 366 for operating the server, databases, etc. The control program 366 may control the processor 350. The processor 350 preferably performs instructions of the control program 366, and thereby operates in accordance with the methods described. The control program 366 may be stored in a compressed, uncompiled and/or encrypted format. The control program 366 furthermore includes program elements that may be necessary, such as an operating system, a database management system and device drivers for allowing the processor 350 to interface with peripheral devices, databases, etc. Appropriate program elements are known to those skilled in the art, and need not be described in detail herein.

The device 340 also may include or store information regarding users, user devices, conferences, MPs, communications, etc. For example, information regarding one or more conferences may be stored in a conference information database 368 for use by the device 340 or another device or entity. Information regarding one or more MPs may be stored in an MP information database 370 for use by the device 340 or another device or entity. In some embodiments, some or all of one or more of the databases may be stored or mirrored remotely from the device 340.

According to some embodiments, the instructions of the control program may be read into a main memory from another computer-readable medium, such as from the ROM 362 to the RAM 364. Execution of sequences of the instructions in the control program causes the processor 350 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 350, communication port 352, clock 354, output device 356, input device 358, data storage device 360, ROM 362, and RAM 364 may communicate or be connected directly or indirectly in a variety of ways. For example, the processor 350, communication port 352, clock 354, output device 356, input device 358, data storage device 360, ROM 362, and RAM 364 may be connected via a bus 374.

As described above, in some embodiments, a system may include a processor; a communication port coupled to the processor and adapted to communicate with at least one device; and a storage device coupled to the processor and storing instructions adapted to be executed by the processor to: receive an indication of a need for a media processor for a new conference; determine, for each of a plurality of media processors under control of a multipoint controller, a number of additional participants that can be supported; and determine one of the plurality of media processors to the host new conference based, at least in part, on the number of additional participants that each of the plurality of media processors can support. In other embodiments, the processor may be adapted to implement one or more elements of other methods described herein. For example, in some embodiments, the processor may be adapted to receive an indication of a need for a media processor for a new conference; determine, for each of a plurality of media processors under the control of a multipoint controller, a current number of conference participants and a current CPU utilization; and determine one of the plurality of media processors to host the new conference based, at least in part, on the current number of conference participants and current CPU utilization for each of the plurality of media processors.

While specific implementations and hardware/software configurations for a device 340 have been illustrated, it should be noted that other implementations and hardware/software configurations are possible and that no specific implementation or hardware configuration is needed. Thus, not all of the components illustrated in FIG. 4 may be needed for a device implementing one or more of the elements of the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments one or more of the elements for the methods described above are optional or can be combined or performed in one or more alternative orders or sequences without departing from the scope of the invention and the claims should not be construed as being limited to any particular order or sequence, unless specifically indicated.

Each of the methods described above can be performed on a single computer, computer system, microprocessor, etc. In addition, two or more of the elements in each of the methods described above may be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the invention has been described with respect to various embodiments thereof, those skilled in the art will note that various substitutions may be made to those embodiments described herein without departing from the spirit and scope of the invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for selecting a media processor to host a new conference, comprising:
   receiving, by a multipoint controller, an indication of a need for a media processor to host a new conference;
   determining by the multipoint controller, for each of a plurality of media processors under control of the multipoint controller, a number of additional participants that can be supported by each of said plurality of media processors based on a current number of conference participants on each of said plurality of media processors and based on a current CPU utilization percentage for each of said plurality of media processors in accordance with the following expression:

$NbChannels = CurrentNbChannels \times ((MaxCPUUtil/CurrentCPUUtil) - 1)$ where NbChannels is a number of new conference participants or channels each media processor can support, CurrentNbChannels is a value indicating the current number of conference participants on a media processor, MaxCPUUtil is a constant value indicating a maximum CPU utilization percentage allowed for the media processor, CurrentCPUUtil is a value indicating a current CPU utilization percentage for the media processor, the value of CurrentNbChannels is set to one for determining NbChannels if it is zero, and the value CurrentCPUUtil is set to one for determining NbChannels if it is zero; and
   determining which one of said plurality of media processors is to host said new conference based, at least in part, on said determined number of additional participants that each of said plurality of media processors can support, where the number of participants in said new conference is not known at the time of the determining of the number of additional participants that can be supported by each of said plurality of media processors, the number of participants in said new conference may dynamically change, and at least two of said plurality of media processors operate on different devices having different capabilities.

2. The method of claim 1, wherein said receiving an indication of a need for a media processor for a new conference includes receiving a request for allocation of a media processor for said new conference.

3. The method of claim 1, further comprising:
   providing data indicative of said one of said plurality of media processors.

4. The method of claim 1, further comprising:
   allocating said one of said plurality of media processors to host said new conference.

5. The method of claim 1, further comprising:
   determining a value representative of a maximum CPU utilization percentage associated with each of said plurality of media processors.

6. A method for selecting a media processor to host a new conference, comprising:
   receiving, by a multipoint controller, an indication of a need for a media processor to host a new conference;
   determining by the multipoint controller, for each of a plurality of media processors under the control of the multipoint controller, a current number of conference participants and a current CPU utilization; and
   determining one of said plurality of media processors to host said new conference based, at least in part, on said determined current number of conference participants and based on said determined current CPU utilization for each of said plurality of media processors, in accordance with the following expression:

$NbChannels = CurrentNbChannels \times ((MaxCPUUtil/CurrentCPUUtil) - 1)$ where NbChannels is a number of new conference participants or channels each media processor can support, CurrentNbChannels is a value indicating the current number of conference participants on a media processor, MaxCPUUtil is a constant value indicating a maximum CPU utilization percentage allowed for the media processor, CurrentCPUUtil is a value indicating a current CPU utilization percentage for the media processor, the value of CurrentNbChannels is set to one for determining NbChannels if it is zero, and the value CurrentCPUUtil is set to one for determining NbChannels if it is zero, and where the number of participants in said new conference is not known at the time of the determining of the number of additional participants that can be supported by each of said plurality of media processors, the number of participants in said new conference may dynamically change, and at least two of said plurality of media processors operate on different devices having different capabilities.

7. The method of claim 6, wherein said determining one of said plurality of media processors to host said new conference includes selecting one of said plurality of media processors based on each of said plurality of media processors ability to support participants in said new conference.

8. The method of claim 6, wherein said determining one of said plurality of media processors to host said new conference includes selecting one of said plurality of media processors that can support a highest number of participants in said new conference.

9. The method of claim 6, wherein said determining one of said plurality of media processors to host said new conference includes determining a number of new participants that can be supported by each of said plurality of media processors.

10. A system, comprising:

a device having a processor and a multipoint controller operating on said device, wherein said multipoint controller controls a plurality of media processors and said multipoint controller is adapted to select a first media processor from said plurality of media processors to support a new conference based on said first media processor's ability to support more additional participants than other media processors in said plurality of media processors based, at least in part, on said first media processor's current number of conference participants and based on current CPU utilization percentage in accordance with the following expression:

$$NbChannels = CurrentNbChannels \times ((MaxCPUUtil/CurrentCPUUtil) - 1)$$

where NbChannels is a number of new conference participants or channels each media processor can support, CurrentNbChannels is a value indicating the current number of conference participants on a media processor, MaxCPUUtil is a constant value indicating a maximum CPU utilization percentage allowed for the media processor, CurrentCPUUtil is a value indicating a current CPU utilization percentage for the media processor, the value of CurrentNbChannels is set to one for determining NbChannels if it is zero, and the value CurrentCPUUtil is set to one for determining NbChannels if it is zero, where the number of participants in said new conference is not known at the time of the determining of the number of additional participants that can be supported by each of said plurality of media processors, the number of participants in said new conference may dynamically change, and at least two of said plurality of media processors operate on different devices having different capabilities.

11. The system of claim 10, wherein at least two of said plurality of media processors are implemented in software and operate on different devices.

12. The system of claim 10, wherein said multipoint controller is adapted to determine a current number of conference participants for at least some of said plurality of media processors.

13. An apparatus, comprising:

a processor;

a communication port coupled to said processor and adapted to communicate with at least one device; and a storage device coupled to said processor and storing instructions adapted to be executed by said processor to:

receive an indication of a need for a media processor for a new conference;

determine, for each of a plurality of media processors under control of a multipoint controller, a number of additional participants that can be supported by each of said plurality of media processors based on a current number of conference participants on each of said plurality of media processors and based on a current CPU utilization percentage for each of said plurality of media processors in accordance with the following expression:

$$NbChannels = CurrentNbChannels \times ((MaxCPUUtil/CurrentCPUUtil) - 1)$$

where NbChannels is a number of new conference participants or channels each media processor can support, CurrentNbChannels is a value indicating the current number of conference participants on a media processor, MaxCPUUtil is a constant value indicating a maximum CPU utilization percentage allowed for the media processor, CurrentCPUUtil is a value indicating a current CPU utilization percentage for the media processor, the value of CurrentNbChannels is set to one for determining NbChannels if it is zero, and the value CurrentCPUUtil is set to one for determining NbChannels if it is zero; and determine one of said plurality of media processors to host said new conference based, at least in part, on said determined number of additional participants that each of said plurality of media processors can support, where the number of participants in said new conference is not known at the time of the determining of the number of additional participants that can be supported by each of said plurality of media processors, the number of participants in said new conference may dynamically change, and at least two of said plurality of media processors operate on different devices having different capabilities.

14. The apparatus of claim 13, wherein said processor is further adapted to provide data indicative of said one of said plurality of media processors.

15. The apparatus of claim 13, wherein said processor is further adapted to allocate said one of said plurality of media processors to host said new conference.

16. An article of manufacture comprising:

a computer readable medium having stored thereon instructions which, when executed by a processor, cause said processor to:

receive an indication of a need for a media processor for a new conference;

determine, for each of a plurality of media processors under control of a multipoint controller, a number of additional participants that can be supported by each of said plurality of media processors based on a current number of conference participants on each of said plurality of media processors and based on a current CPU utilization percentage for each of said plurality of media processors in accordance with the following expression:

$$NbChannels = CurrentNbChannels \times ((MaxCPUUtil/CurrentCPUUtil) - 1)$$

where NbChannels is a number of new conference participants or channels each media processor can support, CurrentNbChannels is a value indicating the current number of conference participants on a media processor, MaxCPUUtil is a constant value indicating a maximum CPU utilization percentage allowed for the media processor, CurrentCPUUtil is a value indicating a current CPU utilization percentage for the media processor, the value of CurrentNbChannels is set to one for determining NbChannels if it is zero, and the value CurrentCPUUtil is set to one for determining NbChannels if it is zero; and determine one of said plurality of media processors to said host new conference based, at least in part, on said determined number of additional participants that each of said plurality of media processors can support and based on a current CPU utilization percentage for each of said plurality of media processors, where the number of participants in said new conference is not known at the time of the determining of the number of additional participants that can be supported by each of said plurality of media processors, the number of participants in said new conference may dynamically change, and at least two of said plurality of media processors operate on different devices having different capabilities.

* * * * *